United States Patent
Vadamalayan et al.

(10) Patent No.: US 10,691,707 B2
(45) Date of Patent: Jun. 23, 2020

(54) SYSTEMS AND METHODS FOR IDENTIFYING AN AFFINITY GROUP

(71) Applicant: Honeywell International Inc., Morristown, NJ (US)

(72) Inventors: MuthuRamji Vadamalayan, Chennai (IN); Deepakumar Subbian, Gland (CH); Kathiresan Periyasamy, Bangalore (IN); Malayappan Gurudoss, Kumbakonam (IN)

(73) Assignee: Honeywell International Inc., Morris Plains, NJ (US)

(*) Notice: Subject to any disclaimer, the term of this patent is extended or adjusted under 35 U.S.C. 154(b) by 264 days.

(21) Appl. No.: 15/856,214

(22) Filed: Dec. 28, 2017

(65) Prior Publication Data

US 2019/0205452 A1   Jul. 4, 2019

(51) Int. Cl.
*G06F 16/24* (2019.01)
*G06F 16/2458* (2019.01)
*G06F 16/951* (2019.01)
*G07C 9/27* (2020.01)
*G06F 16/248* (2019.01)

(52) U.S. Cl.
CPC ........ *G06F 16/2477* (2019.01); *G06F 16/248* (2019.01); *G06F 16/951* (2019.01); *G07C 9/27* (2020.01)

(58) Field of Classification Search
CPC .................................................. G06F 16/2477
USPC ......................................................... 707/737
See application file for complete search history.

(56) References Cited

U.S. PATENT DOCUMENTS

| | | | |
|---|---|---|---|
| 8,712,882 B2 | 4/2014 | Niazi | |
| 2002/0171546 A1 | 11/2002 | Evans et al. | |
| 2004/0021552 A1* | 2/2004 | Koo | G07C 9/00087 340/5.53 |
| 2009/0012760 A1 | 1/2009 | Schunemann | |
| 2009/0145964 A1 | 6/2009 | Blythe | |
| 2011/0307303 A1 | 12/2011 | Dutta et al. | |
| 2013/0090980 A1 | 4/2013 | Hummel | |
| 2015/0341375 A1* | 11/2015 | Bauer | H04L 63/107 726/22 |

FOREIGN PATENT DOCUMENTS

EP      2003620 A2    12/2008

OTHER PUBLICATIONS

Extended European Search Report, 18200461.4, 9 pp., dated Jan. 7, 2019.

(Continued)

*Primary Examiner* — Syling Yen
(74) *Attorney, Agent, or Firm* — Seager, Tufte & Wickhem, LLP

(57) ABSTRACT

Systems and methods for identifying an affinity group are provided. Some systems and methods may include matching respective access times associated with a plurality of access cards over a defined search period and using a swipe time interval to identify the affinity group of at least one of the plurality of access cards.

20 Claims, 1 Drawing Sheet

(56) References Cited

OTHER PUBLICATIONS

Conlin et al., Measuring Employee Engagement at the United States Patent and Trademark Office, an Interactive Qualifying Project Report for the United States Patent and Trademark Office submitted to the Faculty of the Worcester Polytechnic Institute in Partial Fulfillment of the Requirements for the Degree of Bachelor Science, Dec. 13, 2012, IQP Project No. 1204; Faculty Code: MR1; Division Number: 46.

Yan et al.,Detection of Suspicious Patterns in Secure Physical Environments, downloaded Sep. 29, 2017.

Considering Affinity Groups in Today's Workplace > MRA, Nov. 20, 2017, http://www.mranet.org/Member-Benefits/Member-Only-Benefits/Publications/Inside-HR-Newsletter/ID/863/Considering-Affinity-Groups-in-Todays-Work . . . .

* cited by examiner

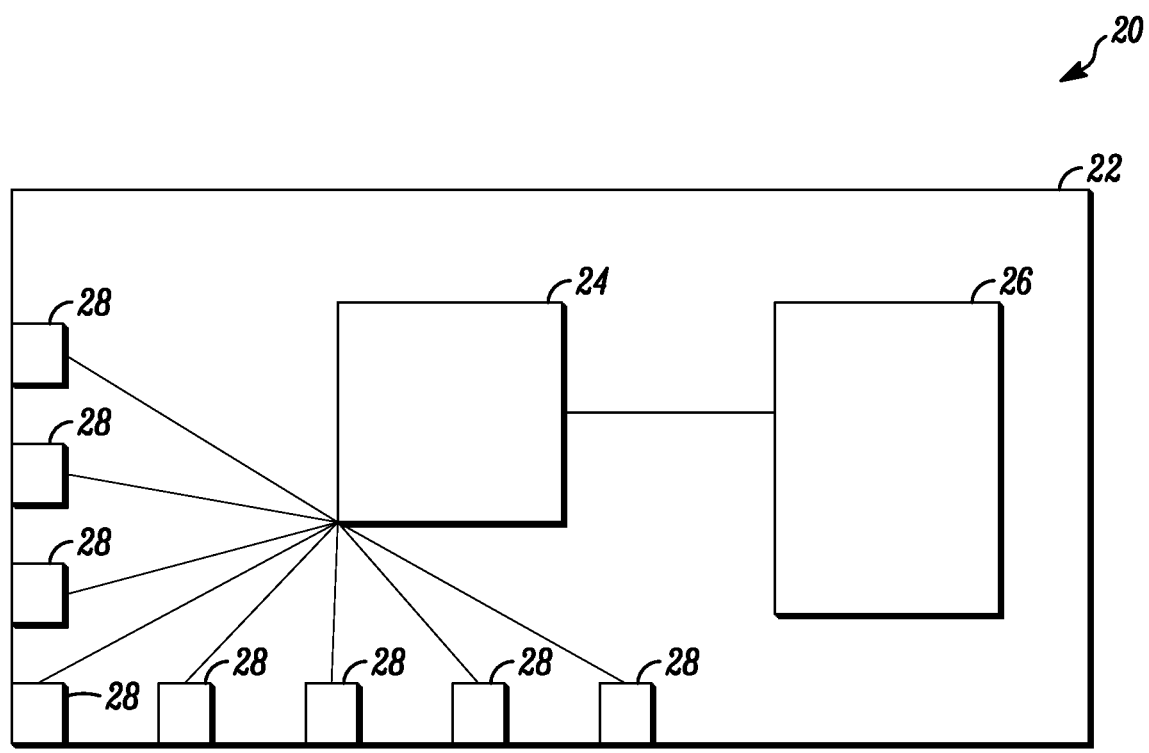

SYSTEMS AND METHODS FOR IDENTIFYING AN AFFINITY GROUP

FIELD

The present invention generally relates to systems and methods for identifying an affinity group. More particularly, the present invention relates to systems and methods for matching respective access times associated with a plurality of access cards over a defined search period to identify the affinity group of at least one of the plurality of access cards.

BACKGROUND

Known systems and methods analyze access card data from individual cards or a complete set of cards to extract data about the functioning of an operation and make predictions about future performance of an organization or a user associated with one of the access cards. However, such systems and methods do not analyze past access card time data to identify an affinity group relationship between different ones of the access cards.

In view of the above, there is a continuing, ongoing need for improved systems and methods.

BRIEF DESCRIPTION OF THE DRAWINGS

FIG. 1 is a block diagram of an access control system in accordance with disclosed embodiments.

DETAILED DESCRIPTION

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein may include systems and methods for identifying an affinity group of one or more of a plurality of access cards or users associated therewith. For example, systems and methods disclosed herein may include matching respective access times associated with each of the plurality of access cards with respective access times associated with at least one of the plurality of access cards within a range set by a swipe time interval.

Systems and methods as disclosed herein are described in connection with an enterprise level monitoring system, security system, or access control system. It is to be understood that such systems may include, but are not limited to systems that include a user interface device, a database device, and a plurality of access control terminals or devices.

In accordance with disclosed embodiments, the plurality of access cards may be used to access a secured premise, and the respective access times associated with each of the plurality of access cards may be stored in a database device. For example, each of the respective access times may represent a respective time at which an associated one of the plurality of access cards is swiped at a respective access terminal of the secured premises. The user interface device may receive first input selecting at least one of plurality of access cards, second input defining a search period, and third input defining a swipe time interval, and a programed processor of the user interface device may identify, from the database device, a first group of the plurality of access cards for which, during the search period, a threshold number of the respective access times associated with the first group of the plurality of access cards match the respective access times associated with the at least one of the plurality of access cards within a range of plus or minus half the swipe time interval. Furthermore, in some embodiments, the user interface device may output a report designating the first group of the plurality of access cards and the at least one of the plurality of access cards as forming an affinity group.

In some embodiments, the database device may store a single list of access records associated with the secured premises, and each entry in the single list of access records may include a respective identifier of a respective one of the plurality of access cards and a respective one of the respective access times. Additionally or alternatively, the database device may store a separate list of records for each of the plurality of access cards. Regardless of the specific storage method, the programed processor may first identify all of the respective access times associated with the at least one of the plurality of access cards selected by the first input that fall within the search period. In some embodiments, the programed processor may limit searching of the database device to only the respective access times falling within the search period.

In some embodiments, the programed processor may convert the respective access times retrieved for the at least one of the plurality of access cards into time ranges with each of the time ranges having a lower value equal to the respective one of the respective access times minus half the swipe time interval and a respective higher value equal to the respective one of the respective access times plus half the swipe time interval. In some embodiments, such a range conversion may be done by adding and subtracting the full swipe time interval. Regardless, the programed processor may then search the database device for each of the respective access times falling within the time ranges, count a number of times the respective access times associated with each of the plurality of access cards fall within the time ranges, and identify the first group of the plurality of access cards as those for which the number of times counted meets or exceeds the threshold number. In some embodiments, the threshold number may be one, and in these embodiments, the first group of the plurality of access cards may include each of the plurality of access cards associated with the respective access times during the search period that fall within the time ranges associated with the respective access times associated with the at least one of the plurality of access cards.

In some embodiments, the database device may store respective access locations associated with each of the plurality of access cards and associate each of the respective access times with a respective one of the respective access locations. For example, each of the respective access locations may represent the respective access terminal within the secured premises that recorded associated ones of the respective access times, and in some embodiments, identifying the first group of the plurality of access cards may include the programed processor matching the respective one of the respective access locations associated with each of the respective access times associated with the first group of the plurality of access cards with the respective one of the respective access locations associated with each of the respective access times associated with the at least one of the plurality of access cards. For example, in some embodiments, the programed processor may identify the first group of the plurality of access cards by searching the database device for each of the respective access times falling within the time ranges associated with the respective access times associated with the at least one of the plurality of access cards, assessing whether the respective one of the respective locations associated with each of the respective access times identified matches the respective one of the locations associated with each of the respective access times associated with the at least one of the plurality of access cards, count the number of times the respective access times associated with each of the plurality of access cards falls within the time ranges and matches the respective one of the respective access locations associated with each of the respective access times associated with the at least one of the plurality of access cards, and identify the first group of the plurality of access cards as those for which the number of times counted meets or exceeds the threshold number.

In some embodiments, the first input may select a subset of the plurality of access cards that are known to form an affinity group, and in these embodiments, the programed processor of the user interface device may identify, from the database device, the first group of the plurality of access cards for which, during the search period, the threshold number of the respective access times associated with the first group of the plurality of access cards match the respective access times associated with the subset of the plurality of access cards within the range of plus or minus half the swipe time interval. For example, the programed processor may convert the respective access times associated with the subset group of the plurality of access cards into the time ranges as describe herein, identify each of the time ranges that overlap at least in part, search the database device for each of the respective access times falling within the time ranges that overlap at least in part, count the number of times the respective access times associated with each of the plurality of access cards fall within one of the time ranges that overlap at least in part, and identify the first group of the plurality of access cards as those for which the number of times counted meets or exceeds the threshold number. Furthermore, the user interface device may output the report designating the first group of the plurality of access cards and the subset of the plurality of access cards as forming the affinity group.

In some embodiments each of the plurality of access cards may be associated with a respective user, and in these embodiments, the report output by the user interface device may identify the respective user for each of the plurality of access cards designated as part of the affinity group.

In some embodiments, the report may be overlaid on a security system display, and in some embodiments, the report and the affinity group identified therein may be used in connection with, for example, assigning user mentoring groups, managing inventory, suggesting building layout changes, suggesting carpooling arrangements, optimizing room assignments, revising user access levels, detecting security anomalies, and identifying missing users during an emergency.

FIG. 1 is a block diagram of an access control system 20 in accordance with disclosed embodiments. As shown in FIG. 1, the system 20 may control access to a secured premises 22 and include a control panel or user interface device 24, a database device 26, and a plurality of access control devices or terminals 28. Whenever an access card is used at any of the plurality of access control devices 28, a respective one of the plurality of access control devices 28 may transmit data identifying a respective access time and a respective access location to the user interface device 24, which can store the data in the database device 26. In some embodiments, at least the respective one of the plurality of access control devices 28 may be coupled directly to the database device 26 for storing the data indicative of the respective access location and the respective access time directly therein.

In accordance with disclosed embodiments, the user interface device 24 may receive user input selecting one of a plurality of access cards, defining a search period, and defining a swipe time interval, and responsive thereto, a programed processor of the user interface device 24 may identify, from the database device 26, a first group of the plurality of access cards for which, during the search period, a threshold number of respective access times associated with the first group of the plurality of access cards match the respective access times associated with the one of the plurality of access cards within a range of plus or minus half the swipe time interval. Responsive thereto, the user interface device 24 may output a report designating the first group of the plurality of access cards and the one of the plurality of access cards as forming an affinity group.

Although a few embodiments have been described in detail above, other modifications are possible. For example, the steps described above do not require the particular order described or sequential order to achieve desirable results. Other steps may be provided, steps may be eliminated from the described flows, and other components may be added to or removed from the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A method comprising:
    a user interface device receiving, from a user, first input selecting one or more of a plurality of access cards, the plurality of access cards used to access a secured premise;
    storing respective access times for each of the plurality of access cards in a database device;
    the user interface device receiving, from the user, second input defining a search period;
    the user interface device receiving, from the user, third input defining a swipe time interval;
    identifying, from the database device, a first group of the plurality of access cards as having an affinity with the selected one or more access cards by identifying, during the search period, those access cards that have at least a threshold number of respective access times that match a respective access time associated with at least one of the selected one or more access cards by falling within a range of plus or minus half the swipe time interval of the respective access time; and
    the user interface device outputting a report designating the first group of the plurality of access cards and the selected one or more access cards as forming an affinity group.

2. The method of claim 1 further comprising:
    storing respective access locations for each of the plurality of access cards in the database device; and
    associating each of the respective access times with a respective one of the respective access locations,
    wherein identifying the first group of the plurality of access cards includes matching the respective one of the respective access locations associated with each of the respective access times associated with the first group of the plurality of access cards with the respective one of the respective access locations associated with each of the respective access times associated with the selected one or more access cards.

3. The method of claim 2 wherein each of the respective access times represents a respective time at which an associated one of the plurality of access cards is swiped at a respective access terminal of the secured premises, and wherein each of the respective access locations represents the respective access terminal within the secured premises that recorded associated ones of the respective access times.

4. The method of claim 1 wherein the threshold number is one.

5. The method of claim 1 wherein each of the respective access times represents a respective time at which an associated one of the plurality of access cards is swiped at a respective access terminal of the secured premises.

6. The method of claim 1 wherein each of the plurality of access cards is associated with a respective user, and wherein the report identifies the respective user of each of the plurality of access cards designated as part of the affinity group.

7. The method of claim 1 further comprising displaying the report on a security system display.

8. A system comprising:
a user interface device; and
a database device,
wherein the database device stores respective access times for each of a plurality of access cards used to access a secured premises,
wherein the user interface device receives, from a user, first input selecting one or more of a plurality of access cards, second input defining a search period, and third input defining a swipe time interval,
wherein a programed processor of the user interface device identifies, from the database device, a first group of the plurality of access cards as having an affinity with the selected one or more access cards by identifying, during the search period, those access cards that have at least a threshold number of respective access times that match a respective access time associated with at least one of the selected one or more access cards by falling within a range of plus or minus half the swipe time interval of the respective access time, and
wherein the user interface device outputs a report designating the first group of the plurality of access cards and the selected one or more access cards as forming an affinity group.

9. The system of claim 8 wherein the database device stores respective access locations for each of the plurality of access cards, wherein each of the respective access times is associated with a respective one of the respective access locations, and wherein identifying the first group of the plurality of access cards includes matching the respective one of the respective access locations associated with each of the respective access times associated with the first group of the plurality of access cards with the respective one of the respective access locations associated with each of the respective access times associated with the selected one or more access cards.

10. The system of claim 9 wherein each of the respective access times represent a respective time at which an associated one of the plurality of access cards is swiped at a respective access terminal of the secured premises, and wherein each of the respective access locations represents the respective access terminal within the secured premises that recorded associated ones of the respective access times.

11. The system of claim 8 wherein the threshold number is one.

12. The system of claim 8 wherein each of the respective access times represent a respective time at which an associated one of the plurality of access cards is swiped at a respective access terminal of the secured premises.

13. The system of claim 8 wherein each of the plurality of access cards is associated with a respective user, and wherein the report identifies the respective user of each the plurality of access cards designated as part of the affinity group.

14. The system of claim 8 further comprising a security system display that displays the report.

15. A method comprising:
a user interface device receiving, from a user, a first input selecting a first group of a plurality of access cards, the plurality of access cards used to access a secured premise;
storing respective access times for each of the plurality of access cards in a database device;
the user interface device receiving, from the user, second input defining a search period;
the user interface device receiving, from the user third input defining a swipe time interval;
identifying, from the database device, a first set of the respective access times associated with the first group of the plurality of access cards for which, during the search period, each of the first set of the respective access times matches each other by falling within a range of plus or minus half the swipe time interval;
identifying, from the database device, a second group of the plurality of access cards for which, during the search period, at least a threshold number of the respective access times associated with the second group of the plurality of access cards match the first set of the respective access times by falling within a range of plus or minus half the swipe time interval; and
the user interface device outputting a report designating the first group of the plurality of access cards and the second group of the plurality of access cards as forming an affinity group.

16. The method of claim 15 further comprising:
storing respective access locations for each of the plurality of access cards in the database device; and
associating each of the respective access times with a respective one of the respective access locations,
wherein identifying the first set of the respective access times associated with the first group of the plurality of access cards includes matching the respective one of the respective access locations associated with each of the first set of the respective access times, and
wherein identifying the second group of the plurality of access cards includes matching the respective one of the respective access locations associated with each of the respective access times associated with the second group of the plurality of access cards with the respective one of the respective access locations associated with each of the respective access times.

17. The method of claim 16 wherein each of the respective access times represent a respective time at which an associated one of the plurality of access cards is swiped at a respective access terminal of the secured premises, and wherein each of the respective access locations represents the respective access terminal within the secured premises that recorded associated ones of the respective access times.

18. The method of claim 15 wherein the threshold number is one.

19. The method of claim 15 wherein each of the plurality of access cards is associated with a respective user, and wherein the report identifies the respective user of each of the plurality of access cards designated as part of the affinity group.

20. The method of claim 15 further comprising overlaying the report on a security system display.

\* \* \* \* \*